United States Patent
Kobayashi et al.

(10) Patent No.: US 7,722,711 B2
(45) Date of Patent: May 25, 2010

(54) IMAGE-FORMING RECORDING LIQUID AND IMAGE-FORMING DEVICE

(75) Inventors: Takako Kobayashi, Kanagawa (JP); Yoshihiro Inaba, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 312 days.

(21) Appl. No.: 11/888,575

(22) Filed: Aug. 1, 2007

(65) Prior Publication Data

US 2008/0035019 A1 Feb. 14, 2008

(30) Foreign Application Priority Data

Aug. 8, 2006 (JP) .............................. 2006-215331
Jan. 17, 2007 (JP) .............................. 2007-008001

(51) Int. Cl.
*C09D 11/10* (2006.01)
*G03G 9/12* (2006.01)

(52) U.S. Cl. ..................................... 106/31.92; 430/39
(58) Field of Classification Search .............. 106/31.92; 430/39
See application file for complete search history.

(56) References Cited

U.S. PATENT DOCUMENTS 6,541,538 B1 * 4/2003 Matzinger et al. ........... 523/160
2002/0007765 A1 * 1/2002 Sano et al. ................ 106/31.49

FOREIGN PATENT DOCUMENTS

| JP | 3-29961 | 2/1991 |
| JP | 3-59678 | 3/1991 |
| JP | 2000-211924 | 8/2000 |
| JP | 2000-212498 | 8/2000 |

* cited by examiner

*Primary Examiner*—John L Goodrow
(74) *Attorney, Agent, or Firm*—Fildes & Outland, P.C.

(57) ABSTRACT

An image-forming recording liquid according to the invention contains magnetic polymer particles and a dispersion medium for dispersing the magnetic polymer particles. The magnetic polymer particles contain a magnetic powder and a polymeric compound. The polymeric compound is a polymer prepared by polymerization of at least one monomer selected from the group consisting of a (meth)acrylate monomer and a styrenic monomer. The dispersion medium contains water, polyvinyl alcohol and an acetylene glycol-based surfactant.

17 Claims, 1 Drawing Sheet

IMAGE-FORMING RECORDING LIQUID AND IMAGE-FORMING DEVICE

CROSS-REFERENCE TO RELATED APPLICATIONS

This application is based on and claims priority under 35 USC 119 from Japanese Patent Application Nos. 2006-215331 filed Aug. 8, 2006 and 2007-008001 filed Jan. 17, 2007.

BACKGROUND

1. Technical Field

The invention relates to an aqueous image-forming recording liquid and an image-forming device using the same.

2. Related Art

Printing methods by using magnetic ink have been used widely for high-security documents such as stock certificates. A specific example of the magnetic printing is the characters for magnetic-ink printing specified in JIS X9002, which are aimed at expressing characters.

In addition, magnetic printing methods of printing magnetic barcodes by using a magnetic ink are also well known. In magnetic printing, the magnetic ink is applied on various media, for example, by offset printing, screen printing, or gravure printing. In such a case, a black magnetic pigment having a particle diameter of 0.5 to several μm is added to the magnetic ink for providing it with the most favorable printing properties.

On the other hand, along with recent rapid spread of cheaper printers, techniques for performing magnetic printing by systems, such as inkjet and bubble jet (registered trade name), have been reported. It has been required for the magnetic ink used here that the magnetic pigments are dispersed uniformly and the dispersion is less viscous.

There is a so-called magnetography as another image-forming process using a magnetic material. The magnetography has the following processes: forming a magnetic latent image on a magnetic recording medium having a magnetic material on the surface by operation of a magnetism head; developing the magnetic latent image with a magnetic toner; transferring the developed image onto an image-receiving medium thermally or electrostatically; and fixing the image thereon.

SUMMARY

According to an aspect of the invention, there is provided an image-forming recording liquid, comprising:

magnetic polymer particles containing a magnetic powder, and a polymeric compound which is prepared by polymerization of at least one monomer selected from the group consisting of a (meth)acrylate monomer and a styrenic monomer; and a dispersion medium for dispersing the magnetic polymer particles, and containing water, polyvinyl alcohol and an acetylene glycol-based surfactant.

BRIEF DESCRIPTION OF THE DRAWINGS

Exemplary embodiments of the invention will be described in detail based on the following figures, wherein.

DETAILED DESCRIPTION

Figure 1:
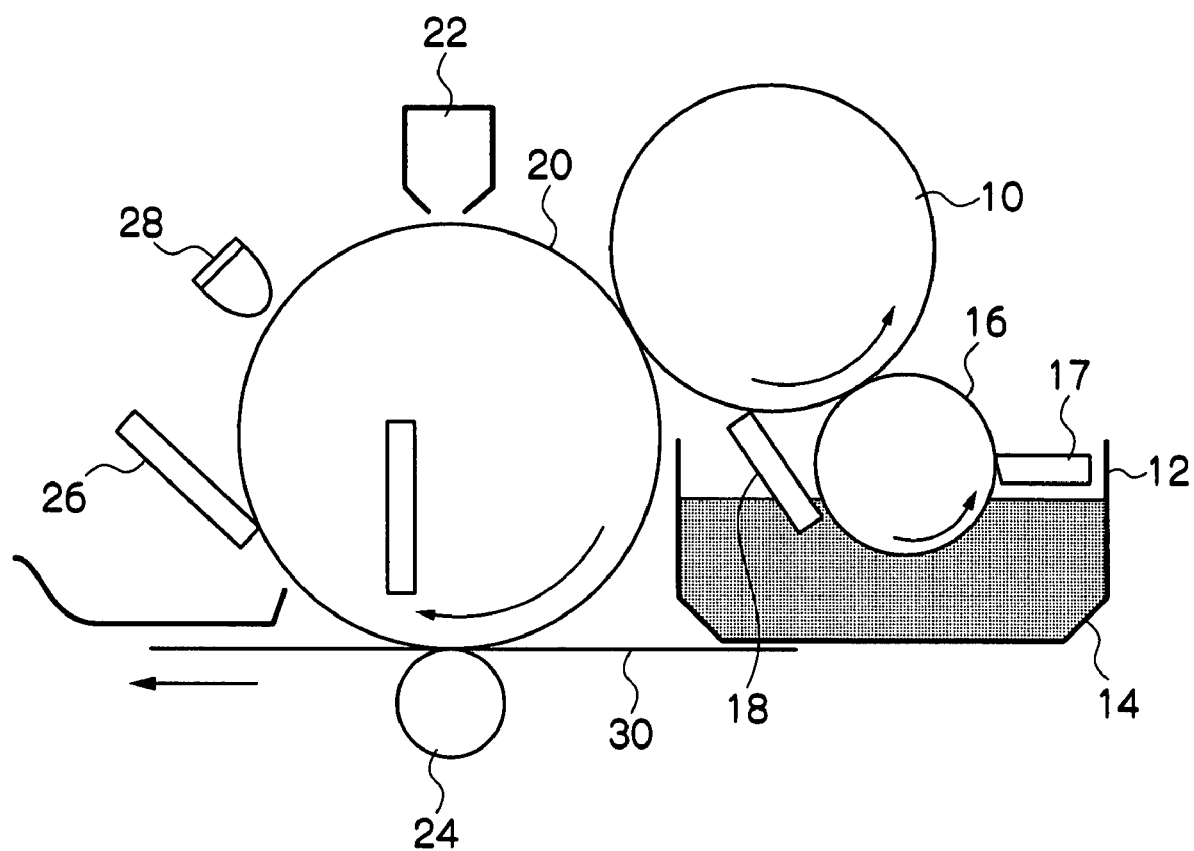
FIG. 1 is a schematic view illustrating the configuration of an example of the image-forming device according to the invention.

A specifically exemplary embodiment will be described in detail below. In the present specification, a phrase " . . . to . . . " represents a range including the numeral values represented before and after "to" as a minimum value and a maximum value, respectively.

<Image-forming Recording Liquid>

The image-forming recording liquid according to the present invention contains magnetic polymer particles and a dispersion medium for dispersing the magnetic polymer particles. The magnetic polymer particles contain a magnetic powder and a polymeric compound. The polymeric compound is a polymer prepared by polymerization of at least one monomer selected from the group consisting of a (meth) acrylate monomer and a styrenic monomer. The dispersion medium contains water, a polyvinyl alcohol and an acetylene glycol-based surfactant.

The inventors have studied intensively on image-forming recording liquids containing small-diameter magnetic polymer particles so as to disperse uniformly in an aqueous dispersion medium. As a result, the inventors found an image-forming recording liquid, which is superior in term of both initial dispersion efficiency and dispersion stability. The image-forming recording liquid is produced by dispersing magnetic polymer particles, containing a polymeric compound made from a particular monomer, in a suitable aqueous solution containing an additive. Even though the magnetic polymer particles contains a magnetic powder and a polymeric compound and having a number-average particle diameter of 0.5 to 5 μm, the image-forming recording liquid including the magnetic polymer particles have the above advantages.

That is, when the polymeric compound constituting the so-called binder of the magnetic polymer particles is a polymer formed from at least a (meth)acrylate monomer or a styrenic monomer, it is possible to increase the dispersibility of the magnetic polymer particles, by adding polyvinyl alcohol (PVA) into the dispersion medium, even when the dispersion medium is a solution containing water.

When the acetylene glycol-based surfactant is added into the dispersion medium, it is possible to make the particles dispersed uniformly by PVA stably maintain their dispersion state.

Hereinafter, each of the components for the image-forming recording liquid according to the present invention will be described specifically.

(Magnetic Polymer Particles)

The image-forming magnetic polymer particle contains a magnetic powder and a polymeric compound.

The magnetic powder includes a magnetic compound such as magnetite or ferrite represented by Formula MO—$Fe_2O_3$ or M-$Fe_3O_4$. In the Formula above, M represents a bivalent or monovalent metal ion (Mn, Fe, Ni, Co, Cu, Mg, Zn, Cd, Li or the like); and metals M may be used alone or in combination or two or more. Specific examples thereof include iron oxides such as magnetite, γ-iron oxide, Mn—Zn ferrite, Ni—Zn ferrite, Mn—Mg ferrite, Li ferrite, and Cu—Zn ferrite. Among them, cheaper magnetite is more preferable.

Examples of the other metal oxides include non-magnetic metal oxides of one or more metals selected from Mg, Al, Si, Ca, Sc, Ti, V, Cr, Mn, Fe, Co, Ni, Cu, Zn, Sr, Y, Zr, Nb, Mo, Cd, Sn, Ba, and Pb, and the magnetic metal oxides described above. Examples of the non-magnetic metal oxides include $Al_2O_3$, $SiO_2$, $CaO$, $TiO_2$, $V_2O_5$, $CrO_2$, $MnO_2$, $Fe_2O_3$, $CoO$, $NiO$, $CuO$, $ZnO$, $SrO$, $Y_2O_3$, $ZrO_2$ and the like.

The average primary particle diameter of the magnetic powder is preferably in the range of from about 0.02 μm to about 2.0 μm.

The content of the magnetic powder in the magnetic polymer particles is preferably in the range of from about 2.5 wt % to about 50 wt %, more preferably in the range of from about 3.0 wt % to about 40 wt %, and still more preferably in the range of from about 5.0 wt % to about 30 wt %.

(Polymeric Compound)

The polymeric compound for the binder of the magnetic polymer particles is a polymer prepared from at least one monomer selected from the group consisting of a (meth) acrylate monomer and a styrenic monomer.

The (meth)acrylate monomer means an acrylate or methacrylate monomer, often a common "(meth)acrylic ester", and the styrenic monomer means styrene or a styrene derivative. Hereinafter, they will be represented by the same manner.

The (meth)acrylate monomer is preferably a (meth)acrylic ester made from an alcohol which has a substituted or unsubstituted alkyl group having 1 to 18 carbon atoms. Examples of the alkyl groups include a methyl group, an ethyl group, an n-propyl group, an isopropyl group, an n-butyl group, a t-butyl group, a pentyl group, an isopentyl group, a neopentyl group, a hexyl group, a heptyl group, an n-octyl group, a nonyl group, a decyl group, an undecyl group, a dodecyl group and the like. Other possible examples thereof include a benzyl group, a hydroxyethyl group, a hydroxyethyl group with its hydroxyl group protected with a hydrophobic protecting group such as dihydropyran, a polyoxyethylene group, and the like. The polymeric compound is preferably a polymer made from a monomer containing hydroxyethyl methacrylate or a polymer of the (meth)acrylate additionally modified with (poly)ethylene glycol.

The styrenic monomer is preferably a vinyl group-containing monomer having a substituted or unsubstituted aryl group and having 6 to 12 carbon atoms. Examples of the aryl groups include a phenyl group, a naphthyl group, a tolyl group, and a p-n-octyloxyphenyl group and the like, and a phenyl group is preferable.

Examples of the substituent groups on the alkyl group in the (meth)acrylate monomer or the substituent groups on the aryl group in the styrenic monomer include an alkyl group, an alkoxy group, a halogen atoms, an aryl group, and the like.

Examples of the alkyl groups include those exemplified above as the alkyl groups. Examples of the alkoxy groups include a methoxy group, an ethoxy group, a propoxy group, a butoxy group and the like, and among these groups, a methoxy group and an ethoxy group are favorable. Examples of the halogen atoms include a fluorine atom, a chlorine atom, a bromine atom, and an iodine atom, and preferably a fluorine atom or a chlorine atom. Examples of the aryl groups include those exemplified above as aryl groups.

When both the (meth)acrylate monomer and the styrenic monomeric are used as the monomers, the content rate of the (meth)acrylate monomer to the styrenic monomer in the mixture is preferably in the range of from about 95/5 to about 5/95, more preferably in the range of from about 90/10 to about 10/90, by molar ratio ((meth)acrylate monomer/styrenic monomer).

The magnetic polymer particles contain the above polymer made from the monomer(s;), and in addition, may contain a polymer which is copolymerized the monomer(s) with another monomer(s).

The polymer compound may be copolymerized as needed with a crosslinkable monomer (crosslinking agent) additionally. Specific examples thereof include divinylbenzene, ethylene glycol di(meth)acrylate, diethylene glycol di(meth) acrylate, glycidyl (meth)acrylate, 2-([1'-methylpropylideneamino]carboxyamino)ethyl (meth)acrylate, and the like. Such a compound may be converted into its crosslinked structure during polymerization or after polymerization to polymer particles.

The content of the crosslinking agent in the monomer mixture is preferably about 0.05 to about 20 parts by weight, more preferably about 0.5 to about 10 parts by weight, with respect to 100 parts by weight of the total of the (meth) acrylate and/or styrenic monomers.

A dye, a pigment, carbon black or the like may be added into the magnetic polymer particles for color development of the polymer. In such a case, for example (1) the magnetic powder are previously dispersed in the monomers to be a dispersion, and then the respective additives is added into the dispersion, or (2) the respective additives, the monomers and the magnetic powder are blended previously, and then dispersion of the magnetic powder and the respective additives in monomers is allowed simultaneous.

Any known method may be used in preparing the magnetic polymer particles, and favorable examples thereof include suspension polymerization, emulsion polymerization, dispersion polymerization, seeding polymerization, and the like. It may also be produced by suspension polymerization in the emulsification process known as membrane emulsification.

The magnetic polymer particles thus obtained preferably have a number-average diameter in the range of from about 0.5 μm to about 5 μm, and more preferably in the range of from about 1.0 μm to about 4.0 μm.

The magnetic polymer particles preferably have a variation coefficient of the number-average particle diameter in the range of about 30% or less, and more preferably about 20% or less.

The number-average diameter is a value obtained by taking a photograph of dry particles under an optical or electron microscope measuring the diameters of randomly selected about 100 to about 200 pieces of particles, and calculating the average by dividing the total by the number of the particles.

The variation coefficient is a dimensionless variation coefficient (%) determined by determining the standard deviation (μm) of particle diameter, as an indicator of the particle diameter distribution, based on the particle diameter data obtained above; dividing the standard deviation by the number-average diameter; and then multiplying by 100.

The amount of the hydroxyl groups in the magnetic polymer particle is preferably in the range of from about 0.3 mmol/g to about 5.0 mmol/g, and more preferably in the range of from about 0.4 mmol/g to about 4.0 mmol/g.

The amount of hydroxyl group varies according to the content of the magnetic powder, and thus, is defined as a hydroxyl group content in the polymer components excluding the magnetic powder, and can be determined by a general titrimetric method. For example, the amount of hydroxyl groups can be determined by adding a reagent such as pyridine solution of acetic anhydride to the polymer in a particular amount; heating the mixture; hydrolyzing by addition of water; separating particles from the supernatant liquid with a centrifugal separator; and titrating the supernatant liquid, for example, with an ethanolic potassium hydroxide solution for example by using phenol phthalein as an indicator.

(Dispersion Medium)

The image-forming recording liquid contains the magnetic polymer particles described above dispersed in a dispersion medium. The dispersion medium is a solution containing water, polyvinyl alcohol (PVA), and the acetylene glycol-based surfactant.

The "water" means purified water such as distilled water, ion-exchange water, or ultrapure water.

The polyvinyl alcohol (PVA) is preferably a polyvinyl alcohol having an average polymerization degree of from about 300 to about 4,000 that may be saponified completely or partially. Specific examples thereof include, but are not limited to, reagents available from Wako Pure Chemical Industries Co., Ltd., each containing a polyvinyl alcohol having an average polymerization degree of 500, 1,000, 1,500, 2,000, 2,800, or 3,500; the KURARAY POVAL products in various grades available from Kuraray Co., Ltd., and the Denka polyvinyl alcohols available from Denki Kagaku Kogyo K.K.

The polyvinyl alcohol has preferably a saponification value of about 70 mol % or more, and more preferably in the range of about 80 mol % to about 100 mol %.

The average polymerization degree of the polyvinyl alcohol is more preferably in the range of from about 200 to about 3,000, and still more preferably in the range of from about 300 to about 2,500.

The saponification value and polymerization degree are determined respectively according to the methods specified in JIS K6726: 1994.

In the image-forming recording liquid according to the present invention, polyvinyl alcohol is preferably contained in the dispersion medium in an amount of about 0.1 wt % to about 10 wt %, and preferably about 1 wt % to about 5 wt %.

On the other hand, the acetylene glycol-based surfactant is an acetylenediol-based non-ionic surfactant in a bilaterally symmetrical structure, having an acetylene group in the center, alcoholic hydroxyl groups or the derivatives thereof at the sides. A molecular structure of the surfactant is a very stable glycol. The acetylene glycols have smaller molecular weight, and are effective for reducing the surface tension significantly. Specific examples thereof include, but are not limited to, Surfynol series products available from Nisshin Chemical Industry Co., Ltd. and Acetynol E series products available form Kawaken Fine Chemicals Co., Ltd.

It is desirable for the acetylene glycol-based surfactant to be add polyethyleneoxide represented by $-(OCH_2CH_2)_nOH$ to both sides of the acetylene group. An ethyleneoxide number "n" of the acetylene glycol-based surfactant is preferably in the range of from 2 to 90. The ethyleneoxide number means the repeating number of ethyleneoxide unit in one molecule of the acetylene glycol-based surfactant.

In the image-forming recording liquid according to the present invention, the acetylene glycol-based surfactant is preferably contained in the dispersion medium in an amount of from about 0.01 wt % to about 5 wt %, and more preferably of about 0.1 wt % to about 2 wt %.

The reasons for the fact that combined use of polyvinyl alcohol and the acetylene glycol-based surfactant as the dispersion medium is effective in giving favorable properties in the present invention are yet to be understood, but it seems that the polyvinyl alcohol reduces the interaction among magnetic polymer particles including the magnetic powder particles in the image-forming recording liquid and addition of the acetylene glycol-based surfactant enables improvement of dispersion.

The ratio (P/Q) of the amount P (parts by weight) of polyvinyl alcohol added into the dispersion medium to the amount Q (parts by weight) of the acetylene glycol-based surfactant added is preferably in the range of from about 1000/1 to about 1/1, and more preferably in the range of about 100/1 to about 5/1.

The image-forming recording liquid according to the present invention may contain additionally as needed other additives such as pH adjuster (such as sodium dihydrogen phosphate), benzoic acid, dichlorophen, hexachlorophen, sorbic acid or the like, for the fungi-proof, antiseptic or rust-proof or the like. Ethylene glycol, glycerol or a polyvalent alcohol may be added thereto, for control of vaporization of the dispersion medium.

The concentration of the magnetic polymer particles in the image-forming recording liquid varies according to the system wherein the recording liquid is used, but is preferably in the range of from about 0.5 wt % to about 40 wt %, and more preferably in the range of from about 1 wt % to about 20 wt %.

The viscosity of the image-forming recording liquid may vary according to the system where the recording liquid is used, but is preferably in the range of from about 1 mPa·s to about 500 mpa·s.

The image-forming recording liquid according to the present invention may be prepared in the following procedure, but the production method is not limited thereto.

First, water as the main solvent and other additives described above are stirred with a magnetic stirrer or the like, and the magnetic polymer particles are dispersed therein. Any known method of dispersion may be used. Examples thereof include dispersing machines such as ball mill, sand mill, attritor, and roll mill. Other examples of methods for dispersing include a method of dispersing by spinning a special agitating blade at high speed such as a mixer, a method of dispersing by shearing force of rotor-stator such as a homogenizer, a method of dispersing with ultrasonic wave, and the like.

The image-forming recording liquid is obtained as follows. After the dispersion separated is confirmed by microscopic observation etc. that the magnetic polymer particles are completely dispersed in the liquid, the additive such as an antiseptic is added thereto. It is confirmed that the additive is completely dissolved thereof, and then the dispersion obtained is filtered for removal of dust and bulky particles, for example, though a membrane filter having a pore size of about 100 μm.

In the image-forming recording liquid according to the present invention, the magnetic polymer particles are preferably dispersed independently to each other, as described above. In that sense, the dispersion-average particle diameter of the magnetic polymer particles in liquid is as close as possible to the number-average particle diameter of the magnetic polymer particles used for production of the image-forming recording liquid. From the viewpoints, in the present invention, when the ratio of the dispersion-average particle diameter A (μm) of the magnetic polymer particles to the number-average particle diameter B (μm) (A/B) is used as an indicator of the liquid property, the rate A/B is preferably about 3.0 or less, and more preferably about 2.5 or less. The lower limit of the ratio A/B is ideally about 1.0.

The dispersion-average particle diameter of the magnetic polymer particles is a volume-average diameter as determined by using Coulter Counter Multisizer 3 (Beckman Coulter K. K.). The measuring condition will be described below.

<Image-Forming Device>

The image-forming recording liquid according to the present invention is used in displaying an image on a recording medium in a recording system. The image-forming recording liquid may be used in any system, for example, an inkjet system of displaying an image by ejecting ink solution from the head and mechanically guiding the solution onto recording paper. Specific examples of the inkjet system include thermal inkjet, bubble inkjet, piezo inkjet, microdot inkjet, IRIS inkjet, or multi-nozzle inkjet, or a magnetographic system of displaying an image on recording paper by developing a magnetic latent image with image-recording particles and transferring the image onto an image-receiving medium.

An image-forming device employed the magnetography system, in which the image-forming recording liquid according to the present invention is particularly favorably used as the magnetic recording liquid, will be described briefly with reference to drawings.

The magnetography is a method of forming a patterned magnetic latent image such as of character or image, visualizing the image with a magnetic toner, and giving a hard copy thereof FIG. 1 is a schematic view illustrating the configuration of an example of the main components in an image-forming device in the magnetographic method. As shown in the Figure in the image-forming device, an image is formed by bringing a developing roll 10 carrying the image-forming recording liquid into contact with a magnetic recording drum 20.

First, according to an image signal, a magnetic latent image is recorded on the magnetic recording drum 20 plated with Co—Ni-based magnetic metal with a magnetic recording head 22 by line-scan method.

Then, the magnetic latent image is visualized with the magnetic polymer particles into a visible image, by bringing the developing roll 10 carrying the recording liquid into contact with the magnetic recording drum 20. The image-forming recording liquid according to the present invention is used as the recording liquid 14. The recording liquid 14 supplies to the developing roll 10 by a recording-liquid-coating roll 16. Herein, a part of the recording-liquid-coating roll 16 is in contact with the recording liquid 14 stored in a storage tank 12, and the other part of the recording-liquid-coating roll 16 is in contact with the developing roll 10. The amount of the liquid held on the recording-liquid-coating roll 16 is controlled with a metering blade 17.

Next, the visible image of magnetic polymer particles on the magnetic recording drum 20 is transferred onto the recording medium, by conveying the visible image to the area in contact with a transfer roll 24, and simultaneously conveying a recording medium 30 through the nip area between the transfer roll 24, which is applied a voltage, and the magnetic recording drum 20. The transferred visible image of the magnetic polymer particles is conveyed to a fixing unit not shown in the Figure, and then it is fixed with the fixing unit onto the recording medium 30 under heat and pressure.

On the other hand, the toner remaining on the magnetic recording drum 20 after transfer is removed with a blade 26, and the magnetic latent image on the surface of the magnetic recording drum 20 is erased with a demagnetizing head 28. After development, the recording liquid remaining on the surface of the developing roll 10 is scratched with a cleaning blade 18 in contact with the developing roll 10 surface, and removed into the storage tank 12.

It might be possible for the image-forming device employed the magnetographic system to obtain a high-quality image and also to prevent contamination of the working environment with non-aqueous solvents, by using the image-forming recording liquid according to the present invention containing the magnetic polymer particles dispersed in a dispersion medium including water as the magnetic recording liquid.

EXAMPLES

Hereinafter, the present invention will be described specifically with reference to Examples, but these Examples are aimed only for exemplification, and it should be understood that the scope of the present invention is not restricted thereby. The "part" and "%" in the following Examples mean "parts by mass" and "wt %" respectively, unless specified otherwise.

<Preparation of Surface-Treated Magnetic Powder>

400 parts of a styrene acrylic resin (Eslec P-SE-0020, manufactured by Sekisui Chemical Co., Ltd.) is added to 600 parts of a magnetic powder MTS-010 (manufactured by Toda Kogyo Corp.), and the mixture is kneaded in a pressurized kneader, to give a magnetic powder resin-coated on the surface (magnetic powder content: 60%).

<Preparation of Magnetic Polymer Particles>

(Magnetic Polymer Particles 1)

17 parts of hydroxyethyl methacrylate (manufactured by Wako Pure Chemical Industries), 57 parts of a styrene monomer (manufactured by Wako Pure Chemical Industries), and 1 part of divinylbenzene (manufactured by Wako Pure Chemical Industries) are mixed; 40 parts of the surface-treated magnetic powder is added thereto; and the mixture is dispersed with a ball mill for 48 hours. Five parts of azobisisobutylonitrile as a polymerization initiator (manufactured by Wako Pure Chemical Industries) is added to 90 parts of the magnetic powder dispersion, to give a mixture containing monomers and a magnetic powder.

30 parts of calcium carbonate as a dispersion stabilizer (Luminus, manufactured by Maruo Calcium Co., Ltd.) and 3.5 parts of carboxymethylcellulose (Serogen, manufactured by Dai-ichi Kogyo Seiyaku Co., Ltd.) are added to an aqueous solution containing 28 parts of sodium chloride (manufactured by Wako Pure Chemical Industries) dissolved in 160 parts of ion-exchange water, and the mixture is dispersed with a ball mill for 24 hours, to give a dispersed medium.

The mixture above is added to 200 parts of the dispersed medium, and the mixture is emulsified in an emulsifier (HIGH-FLEX HOMIGINIZER, manufactured by SMT Co., Ltd.) at 8,000 rpm for 3 minutes, to give a suspension. The number-average diameter of the suspended particles then is approximately 2.5 µm.

On the other hand, a separable flask equipped with a stirrer, a thermometer, a condenser tube and a nitrogen-supplying tube is brought under nitrogen atmosphere while nitrogen is supplied through the nitrogen-supplying tube. The suspension is placed therein, allowed to react at 65° C. for 3 hours and then at 70° C. for 10 hours, and then cooled. The reaction solution becomes favorably dispersed, and there is no bulky aggregate observed during polymerization by visual observation.

10% aqueous hydrogen chloride solution is added to the reaction solution, allowing decomposition of calcium carbonate, and solid liquid separation is performed by centrifugation. The particles obtained are washed with 1 L of ion-exchange water; ultrasonic wave dispersion in 500 ml of ethanol for 30 minutes and centrifugation are performed repeatedly three times; and the resulting particles are washed, to give magnetic polymer particles 1.

The magnetic polymer particles 1 are dried in an oven at 60° C., and screened through a mesh having a pore size of 5 μm for separation of bulky particles, to give magnetic polymer particles 1A, and additionally through a nylon mesh having a pore size of 1 μm, to give magnetic polymer particles 1B. The number-average particle diameters of the magnetic polymer particles 1A and 1B are respectively 2.7 μm and 1.2 μm.

The content of magnetic powder in the particle, as determined from the weight loss by heating in thermogravimetric analysis (TGA), is 15% for both magnetic polymer particles 1A and 1B.

An amount of hydroxyl groups in the magnetic polymer particles 1 is 0.6 mmol/g. An amount of hydroxyl groups is determined in the following manner:

First, the polymer particles are weighed and putted into a test tube with a cap; a separately prepared pyridine (manufactured by Wako Pure Chemical Industries) solution of acetic anhydride (manufactured by Wako Pure Chemical Industries) is added in a particular amount thereof, and the mixture is heated at a temperature of 95° C. for 24 hours. After hydrolysis of acetic anhydride in the test tube by addition of distilled water, the mixture is centrifuged at 3,000 rpm for 5 minutes, to separate into particles and a supernatant liquid. The polymer is washed with ethanol (manufactured by Wako Pure Chemical Industries) repeatedly by ultrasonic dispersion and centrifugation; the supernatant liquid and washing water are collected in a conical beaker; and the solution is titrated with 0.1 M ethanolic potassium hydroxide solution (manufactured by Wako Pure Chemical Industries) by using phenol phthalein (manufactured by Wako Pure Chemical Industries) as indicator.

A blank test is also carried out without using the polymer, and an amount of hydroxyl groups (mmol/g) is calculated from the difference according to the following Formula (1):

$$\text{Hydroxyl value} = ((B-C) \times 0.1 \times f)/(w-(w \times D/100)): \quad \text{Formula (1)}$$

In Formula (1) above, B represents the titration amount (ml) in the blank test; C represents the titration amount (ml) in the sample test; f represents the factor of the potassium hydroxide solution; and w represents the weight of the particles (g); and D represents the magnetic powder content (%) in the particles.

(Magnetic Polymer Particles 2)

Magnetic polymer particles 2 are prepared in a similar manner to magnetic polymer particles 1, except that hydroxyethyl methacrylate is not used and only used 75 parts of styrene monomer, and the resulting mixture is separated similarly with a mesh having a pore size of 5 μm and a mesh having a pore size of 1 μm into magnetic polymer particles 2A and magnetic polymer particles 2B.

The number-average particle diameters of the magnetic polymer particles 2A and 2B are respectively 2.0 μm and 0.8 μm.

The content of the magnetic powder in the particle, as determined by thermogravimetric analysis (TGA), is 18% for both magnetic polymer particles 2A and 2B. An amount of hydroxyl groups in the magnetic polymer particles 2 is 0 mmol/g.

Example 1

(Preparation of Image-Forming Recording Liquid)

Five parts of polyvinyl alcohol (KURARAY POVAL 217, manufactured by Kuraray Co., Ltd., polymerization degree: 1,700, saponification value: 88 mol %) is added to 95 parts of cooled ion-exchange water; and the mixture is dispersed while stirred with a magnetic stirrer and agitated; and then the mixture is dissolved white heated in a water bath at 70° C. for 3 hours, to, give an aqueous PVA solution (5% solution).

Magnetic polymer particles 1A: 5 parts
The aqueous PVA solution: 60 parts
Acetylene glycol-based surfactant (Surfynol 465, manufactured by Nisshin Chemical Industry Co., Ltd., ethyleneoxide addition number n: 65): 0.5 part
Ion-exchange water: 34.5 parts The components above are dispersed in a ball mill for 3 hours, to give an image-forming recording liquid 1.

(Evaluation of Image-Forming Recording Liquid)

—Evaluation of Particle Diameter Distribution—

Approximately 0.1 ml of the image-forming recording liquid 1 is dispersed in approximately 100 ml of a test solution isotone (manufactured by Beckman Coulter K. K.), and the volume-average particle diameter (dispersion-average particle diameter) of the particles is determined by using Coulter Counter Multisizer 3 (manufactured by Beckman Coulter K. K.). The measurement is performed twice, that is, immediately after preparation of the recording liquid, and 30 days later.

In the measurement, it is possible to obtain a result similar to the particle diameter distribution in the recording liquid, even though it is diluted with test solution.

Evaluation results are summarized in Table 1, together with the number-average particle diameter of the magnetic polymer particles used.

—Evaluation of Image—

The image-forming recording liquid is coated with a bar coater onto plain paper for copying machine (L paper, manufactured by Fuji Xerox Co. Ltd.) so as to be a coating amount of 0.9 mg per 1 $cm^2$ of image area, and dried thereon indoor at 25° C., to give a solid image of magnetic polymer particles on the plain paper. The cross section of the image region is observed with an optical microscope, and the degree of penetration of the image into the paper is determined.

Evaluation results are summarized in Table 2.

By using an evaluation device of an inkjet printer Jet Wind 500 C (manufactured by Fuji Xerox Co., Ltd.) modified in such a manner that the ink drop diameter is adjustable by control of frequency, images with drop diameters respectively of 50 μm and 80 μm are printed on the plain paper for copying machine (L paper, manufactured by Fuji Xerox Co., Ltd.), and observed with an optical microscope; the dot diameter is determined; and the shape is observed and evaluated.

Evaluation results are summarized in Table 2.

Example 2

An image-forming recording liquid 2 is prepared in a similar manner to Example 1, except that the magnetic polymer particles 1A used in preparation of the image-forming recording liquid in Example 1 are replaced with the magnetic polymer particles 1B.

The image-forming recording liquid 2 is examined similarly to the liquid in Example 1. Results are summarized in Tables 1 and 2.

Example 3

An image-forming recording liquid 3 is prepared in a similar manner to Example 1, except that the magnetic polymer particles 1A used in preparation of the image-forming recording liquid in Example 1 are replaced with the magnetic polymer particles 2A.

The image-forming recording liquid 3 is examined similarly to the liquid in Example 1. Results are summarized in Tables 1 and 2.

Example 4

An image-forming recording liquid 4 is prepared in a similar manner to Example 1, except that the magnetic polymer particles 1A used in preparation of the image-forming recording liquid in Example 1 are replaced with the magnetic polymer particles 2B.

The image-forming recording liquid 4 is examined similarly to the liquid in Example 1. Results are summarized in Tables 1 and 2.

Example 5

An image-forming recording liquid 5 is prepared in a similar manner to Example 1, except that the PVA solution and the acetylene glycol-based surfactant are used respectively in amounts of 0.05 part and 0.05 part in preparation of the image-forming recording liquid Example 1.

The image-forming recording liquid 5 is examined similarly to the liquid in Example 1. Results are summarized in Tables 1 and 2.

Example 6

An image-forming recording liquid 5 is prepared in a similar manner to Example 1, except that the PVA solution and the acetylene glycol-based surfactant are used respectively in amounts of 5 parts and 5 parts in preparation of the image-forming recording liquid Example 1.

The image-forming recording liquid 6 is examined similarly to the liquid in Example 1. Results are summarized in Tables 1 and 2.

Comparative Example 1

Magnetic polymer particles 1A: 5 parts
Aqueous PVA solution: 60 parts
Ion-exchange water: 35 parts An image-forming recording liquid 7 is prepared in a similar manner to Example 1, except that the composition of the recording liquid is changed to that shown above. The image-forming recording liquid 7 is examined similarly to the liquid in Example 1. Results are summarized in Tables 1 and 2.

Comparative Example 2

Magnetic polymer particles 1A: 5 parts
Acetylene glycol-based surfactant: 0.5 part (Surfynol 465, manufactured by Nisshin Chemical Industry Co., Ltd.)
Ion-exchange water: 94.5 parts An image-forming recording liquid 8 is prepared in a similar manner to Example 1, except that the composition of the recording liquid is changed to that shown above. The image-forming recording liquid 8 is examined similarly to the liquid in Example 1. Results are summarized in Tables 1 and 2.

Comparative Example 3

Magnetic powder MTS-010 (manufactured by Toda Kogyo Corp.): 5 parts
Aqueous PVA solution: 60 parts
Acetylene glycol-based surfactant (Surfynol 465, manufactured by Nisshin Chemical Industry Co., Ltd.): 0.5 part
Ion-exchange water: 34.5 parts An image-forming recording liquid 9 is prepared in a similar manner to Example 1, except that the composition of the recording liquid is changed to that shown above. The image-forming recording liquid 9 is examined similarly to the liquid in Example 1. Results are summarized in Tables 1 and 2.

TABLE 1

|  | Image-forming recording liquid No. | Dispersion particle | Number-average particle diameter B ($\mu$m) | Dispersion-average particle diameter A ($\mu$m) Initial | Dispersion-average particle diameter A ($\mu$m) After storage for 30 days | A/B (Initial) |
| --- | --- | --- | --- | --- | --- | --- |
| Example 1 | 1 | Magnetic polymer particles 1A | 2.7 | 3.0 | 3.1 | 1.11 |
| Example 2 | 2 | Magnetic polymer particles 1B | 1.2 | 2.2 | 2.4 | 1.83 |
| Example 3 | 3 | Magnetic polymer particles 2A | 2.0 | 2.1 | 2.1 | 1.05 |
| Example 4 | 4 | Magnetic polymer particles 2B | 0.8 | 1.9 | 2.0 | 2.37 |
| Example 5 | 5 | Magnetic polymer particles 1A | 2.7 | 3.2 | 5.0 | 1.18 |
| Example 6 | 6 | Magnetic polymer particles 1A | 2.7 | 2.9 | 3.1 | 1.07 |
| Comparative Example 1 | 7 | Magnetic polymer particles 1A | 2.7 | 5.7 | 6.0 | 2.11 |
| Comparative Example 2 | 8 | Magnetic polymer particles 1A | 2.7 | 5.5 | 5.7 | 2.04 |
| Comparative Example 3 | 9 | Magnetic powder MTS-010 | 0.1 | 0.9 | 2.4 | 9.00 |

As shown in Table 1, the particles of Examples 1 to 6 are superior in dispersion efficiency and show their original number-average particle diameter even when contained in the recording liquid. They are also favorable in dispersion stability. On the other hand, the particles of Comparative Examples 1 and 2 cause particle aggregation, because the dispersion medium used is lower in dispersion force and dispersion stability. In Comparative Example 3, the dispersion-average particle diameter is 1 μm or less, however, there is observed particle aggregation similar to that in Comparative Example 1.

TABLE 2

| | Image-region cross section | Dot diameter (μm) Drop diameter 50 μm | Dot diameter (μm) Drop diameter 80 μm | Image shape |
|---|---|---|---|---|
| Example 1 | Formed on surface no penetration | 97 | 162 | Sharp image |
| Example 2 | Formed on surface no penetration | 96 | 165 | Sharp image |
| Example 3 | Formed on surface no penetration | 96 | 161 | Sharp image |
| Example 4 | Formed on surface no penetration | 97 | 165 | Sharp image |
| Example 5 | Formed on surface no penetration | 102 | 169 | Slightly sharp image |
| Example 6 | Formed on surface no penetration | 90 | 150 | Slightly sharp image |
| Comparative Example 1 | Formed on surface no penetration | 110 | 178 | Unstabilized shape (with irregular edge) |
| Comparative Example 2 | Formed on surface no penetration | 112 | 180 | Unstabilized shape (with irregular edge) |
| Comparative Example 3 | Formed on surface Penetration into plain paper | 95 | 160 | Partially thinned |

As shown in Table 2, the solid images obtained in Examples 1 to 6 are formed mainly on the surface of the plain paper, and there is almost no penetration of the magnetic polymer particles into the plain paper. Accordingly, high-density images are given, and each dot in the formed image is sharp without bleeding.

On the other hand, in the solid images of Comparative Examples 1 and 2, which are formed on the surface of plain paper, there is almost no apparent penetration of the magnetic polymer particles into the plain paper similarly to Examples, but the dots in the formed image are larger in size and irregular in shape, because of particle aggregation in the dispersion. In addition, the solid image of Comparative Example 3 is thinner, while the dots of the formed image are smaller in size because the solid image penetrates into the plain paper.

The foregoing description of the embodiments of the present invention has been provided for the purses of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An image-forming recording liquid, comprising:
    magnetic polymer particles containing a magnetic powder bound to a polymeric compound which is prepared by polymerization of at least one monomer selected from the group consisting of a (meth)acrylate monomer and a styrenic monomer; and
    a dispersion medium for dispersing the magnetic polymer particles, and containing water, polyvinyl alcohol and an acetylene glycol-based surfactant.

2. The image-forming recording liquid according to claim 1, wherein:
    the number-average particle diameter of the magnetic polymer particles is in the range of from about 0.5 μm to about 5 μm; and
    the variation coefficient of the number-average particle diameter is 30% or less.

3. The image-forming recording liquid according to claim 2, wherein the ratio (A/B) of the dispersion-average particle diameter A (μm) of the magnetic polymer particles to the number-average particle diameter B (μm) of the magnetic polymer particles is about 3.0 or less.

4. The image-forming recording liquid according to claim 1, wherein the polymeric compound is prepared by copolymerizing the (meth)acrylate monomer and the styrenic monomer at a molar ratio ((meth)acrylate monomer/styrenic monomer) in the range of from about 95/5 to about 5/95.

5. The image-forming recording liquid according to claim 1, wherein the polymeric compound is prepared by copolymerization of at least one monomer selected from the group consisting of a (meth)acrylate monomer and a styrenic monomer, together with a crosslinkable monomer.

6. The image-forming recording liquid according to claim 5, wherein the crosslinkable monomer is divinylbenzene, ethylene glycol di(meth)acrylate, diethylene glycol di(meth)acrylate, glycidyl(meth)acrylate, or 2-([1'-methylpropylideneamino]carboxyamino)ethyl (meth)acrylate.

7. The image-forming recording liquid according to claim 5, wherein the content of the crosslinkable monomer is from about 0.05 to about 20 parts by weight, with respect to 100 parts by weight of the total amount of the (meth)acrylate and styrenic monomers.

8. The image-forming recording liquid according to claim 1, wherein an amount of hydroxyl groups in the magnetic polymer particles is from about 0.3 mmol/g to about 5.0 mmol/g.

9. The image-forming recording liquid according to claim 1, wherein the average polymerization degree of the polyvinyl alcohol is in the range of from about 300 to about 4,000.

10. The image-forming recording liquid according to claim 1, wherein the saponification value of the polyvinyl alcohol is about 70 mol % or more.

11. The image-forming recording liquid according to claim 1, wherein the content of the polyvinyl alcohol in the dispersion medium is from about 0.1 wt % to about 10wt %.

12. The image-forming recording liquid according to claim 1, wherein the ethyleneoxide number in the acetylene glycol-based surfactant is in the range of from about 2 to about 90.

13. The image-forming recording liquid according to claim 1, wherein the content of the acetylene glycol-based surfactant in the dispersion medium is from about 0.01 wt % to about 5 wt %.

14. The image-forming recording liquid according to claim 1, wherein the ratio (P/Q) of the addition amount P (parts by weight) of the polyvinyl alcohol to the addition amount Q (parts by weight) of the acetylene glycol-based surfactant is in the range of from about 1000/1 to about 1/1.

15. The image-forming recording liquid according to claim 1, wherein the image-forming recording liquid is used as a magnetic recording liquid for magnetography.

16. The image-forming recording liquid according to claim 1, wherein the image-forming recording liquid is used as an ink-jet recording liquid.

17. An image-forming device, comprising:
a magnetic recording drum,
a magnetic latent image forming unit that forms a magnetic latent image on the magnetic recording drum,
a storage tank that stores an image-forming recording liquid according to claim 1,
a recording liquid supplying unit that supplies the image-forming recording liquid onto the magnetic latent image on the magnetic recording drum to form a visible image on the magnetic latent image,
a transfer unit that transfers the visible image onto a recording medium, and
a demagnetizing unit that erases the latent image from the magnetic recording drum.

* * * * *